(12) United States Patent
Ringseth et al.

(10) Patent No.: US 8,887,162 B2
(45) Date of Patent: Nov. 11, 2014

(54) PERSISTENT LOCAL STORAGE FOR PROCESSOR RESOURCES

(75) Inventors: Paul F. Ringseth, Bellevue, WA (US); Rick Molloy, Redmond, WA (US); Niklas Gustafsson, Bellevue, WA (US); David Callahan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1576 days.

(21) Appl. No.: 12/336,546

(22) Filed: Dec. 17, 2008

(65) Prior Publication Data
US 2010/0153967 A1    Jun. 17, 2010

(51) Int. Cl.
*G06F 12/00*    (2006.01)
*G06F 9/50*    (2006.01)
*G06F 9/48*    (2006.01)

(52) U.S. Cl.
CPC ........ *G06F 9/5016* (2013.01); *G06F 2212/254* (2013.01); *G06F 2212/2542* (2013.01); *G06F 9/485* (2013.01)
USPC .......................................................... 718/102

(58) Field of Classification Search
CPC .................. G06F 2212/254; G06F 2212/2542
USPC .......................................................... 718/102
See application file for complete search history.

(56) References Cited

U.S. PATENT DOCUMENTS

| 5,535,406 | A | 7/1996 | Kolchinsky |
| 5,640,584 | A | 6/1997 | Kandasamy et al. |
| 5,682,531 | A * | 10/1997 | Nakamura ..................... 718/108 |
| 5,978,570 | A | 11/1999 | Hillis |
| 6,075,938 | A | 6/2000 | Bugnion et al. |
| 6,295,600 | B1 * | 9/2001 | Parady .......................... 712/228 |
| 6,546,443 | B1 | 4/2003 | Kakivaya et al. |
| 6,826,757 | B2 | 11/2004 | Steele, Jr. et al. |
| 2004/0088711 | A1 * | 5/2004 | Alverson et al. .............. 718/107 |
| 2006/0173885 | A1 * | 8/2006 | Moir et al. ..................... 707/101 |

OTHER PUBLICATIONS

Hendler et al. "A dynamic-sized nonblocking work stealing deque". 19 pages. Dec. 28, 2005.*
Shen, John. Lipasti, Mikko. "Modern Processor Design: Fundamental of Superscalar Processors". Published Oct. 9, 2002. pp. 415-438.*
"Operating System Structure", Retrieved at<<http://www.ignou.ac.in/virtualcampus/adit/course/cst101/block4/unit1/cst101-bl4-u1-05.htm>>, Aug. 19, 2008, pp. 1-7.

(Continued)

*Primary Examiner* — Robert Fennema
(74) *Attorney, Agent, or Firm* — Kevin Sullivan; Kate Drakos; Micky Minhas (57) ABSTRACT

Local storage may be allocated for each processing resource in a process of a computer system. Each processing resource may be virtualized and may have a one-to-one or a many-to-one correspondence with with physical processors. The contents of each local storage persist across various execution contexts that are executed by a corresponding processing resource. Each local storage may be accessed without synchronization (e.g., locks) by each execution context that is executed on a corresponding processing resource. The local storages provide the ability to segment data and store and access the data without synchronization. The local storages may be used to implement lock-free techniques such as a generalized reduction where a set of values is combined through an associative operator.

20 Claims, 5 Drawing Sheets

(56) References Cited

OTHER PUBLICATIONS

Gidenstam, et al., "LF Threads: A Lock-Free Thread Library or Blocking without Locking", Retrieved at<<http://64.233.183.104/search?q=cache:0lrvc63ON1kJ:www.cs.chalmers.se/~andersg/Papers/CS_TR_2005:20.ps.gz+Wait-free+synchronization+%22virtual+processor%22&h1=en&ct=clnk&cd=3&gl=uk>>, Technical Report No. 2005:20, Gteborg, 2005, pp. 1-26.

"VM Register Conventions", Retrieved at<<http://www.usenix.org/event/jvm02/full_papers/alpern/alpern_html/node13.html>>, Aug. 19, 2008, p. 1.

Herlihy, et al. "Obstruction-Free Synchronization: Double-Ended Queues as an Example", Retrieved at <<http://research.sun.com/projects/scalable/Papers/ICDCS2003.pd>>, 2003, pp. 1-8.

\* cited by examiner

PERSISTENT LOCAL STORAGE FOR PROCESSOR RESOURCES

BACKGROUND

In concurrent programming (viz., interaction between multiple execution contexts such as threads, fibers (i.e., lightweight threads), and child processes), shared data is typically synchronized. When an execution context accesses data, it generally invokes a lock or other synchronization technique to ensure that no other execution context performs a conflicting access to the data. The synchronization prevents data from being corrupted but adds processing overhead to each data access. Perhaps more importantly, the synchronization often serializes the access to the data by different execution contexts. This serialization may inhibit the performance and scalability of a process, particularly where there are many independent processing resources that execute execution contexts.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Local storage may be allocated for each processing resource in a process of a computer system. Each processing resource may be virtualized and may have a one-to-one or a many-to-one correspondence with with physical processors. The contents of each local storage persist across various execution contexts that are executed by a corresponding processing resource. Each local storage may be accessed without synchronization (e.g., locks) by each execution context that is executed on a corresponding processing resource. The local storages provide the ability to segment data and store and access the data without synchronization. The local storages may be used to implement lock-free techniques such as a generalized reduction where a set of values is combined through an associative operator.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
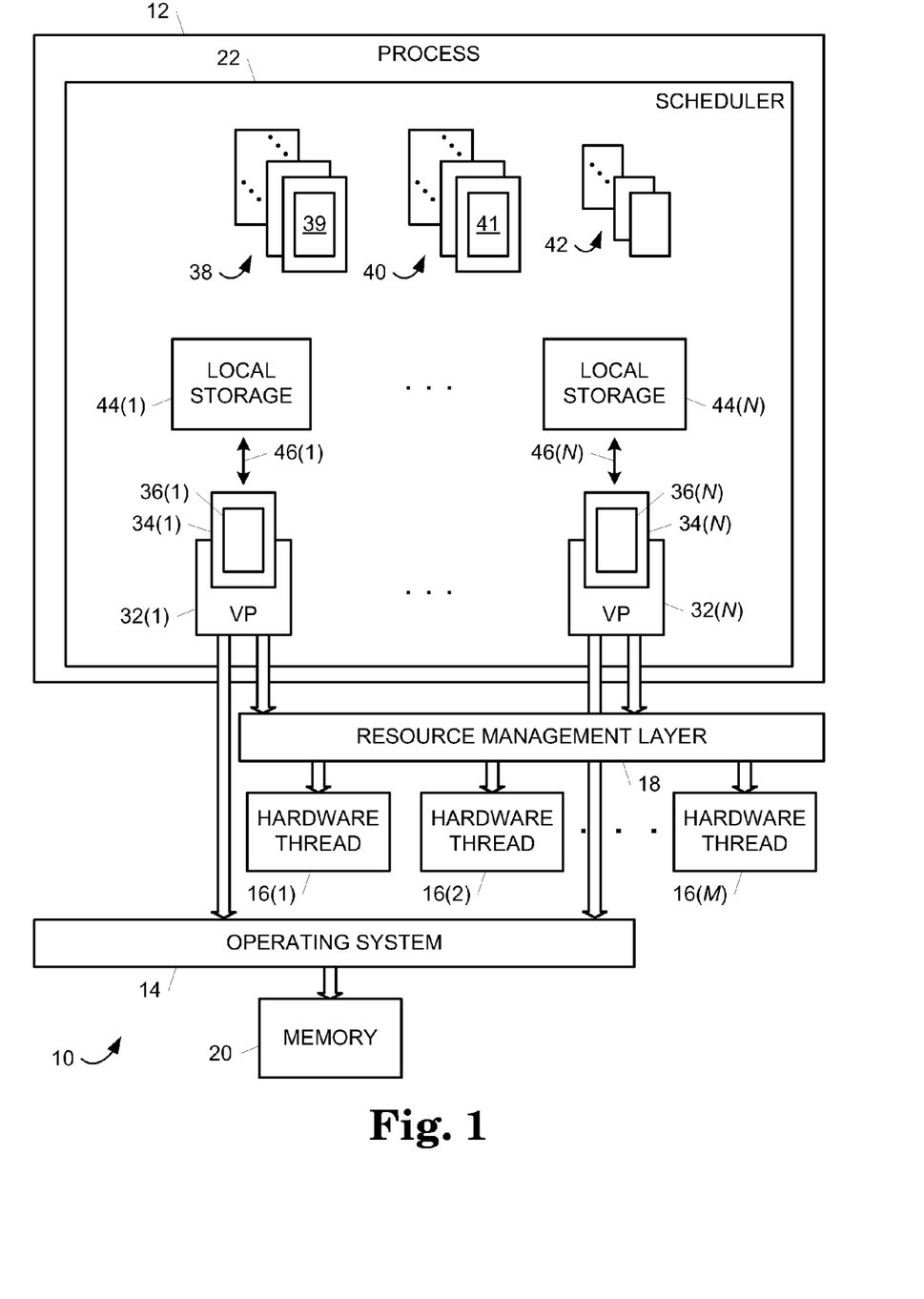
FIG. 1 is a block diagram illustrating an embodiment of a scheduler in a process of a runtime environment.

FIG. 1 is a block diagram illustrating an embodiment of a scheduler 22 in a process 12 of a runtime environment 10. Scheduler 22 is configured to schedule execution contexts for execution by processing resources. In the embodiment of FIG. 1, the processing resources include virtual processors 32(1)-32(N) with corresponding virtual processor local storages 44(1)-44(N) as indicated by respective arrows 46(1)-46(N), where N is an integer greater than or equal to two and denotes the Nth virtual processor 32 or Nth local storage 44.

Runtime environment 10 represents a runtime mode of operation in a computer system, such as a computer system 100 shown in FIG. 6 and described in additional detail below, where the computer system is executing instructions. The computer system generates runtime environment 10 from a runtime platform such as a runtime platform 122 shown in FIG. 6 and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), a resource management layer 18, and a memory system 20. Runtime environment 10 allows tasks from process 12 to be executed, along with tasks from any other processes that co-exist with process 12 (not shown), using OS 14, resource management layer 18, and hardware threads 16(1)-16(M). Runtime environment 10 operates in conjunction with OS 14 and/or resource management layer 18 to allow process 12 to obtain processor and other resources of the computer system (e.g., hardware threads 16(1)-16(M).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads, fibers (i.e., lightweight threads), or child processes). Process 12 obtains access to the processing and other resources in the computer system (e.g., hardware threads 16(1)-16(M) and memory 20) from OS 14 and/or resource management layer 18. Process 12 causes tasks to be executed using the processing and other resources.

Process 12 generates work in tasks of variable length where each task is associated with an execution context in scheduler 22. More than one task may be associated with a given execution context. Each task includes a sequence of instructions that perform a unit of work when executed by the computer system. Each execution context forms a thread (or analogous OS concept such as child process) that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to scheduler 22 and process 12 and allocates memory from memory system 20 to scheduler 22 and process 12. OS 14 may allocate memory from memory system 20 in any suitable fixed or variable sizes (e.g., pages of 4 kilobytes (KB) to 64 KB).

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource management layer 18 allocates processing resources to process 12 by assigning one or more hardware threads 16 to process 12. Resource management layer 18 exists separately from OS 14 in the embodiment of FIG. 1. In other embodiments, resource management layer 18 or some or all of the functions thereof may be included in OS 14.

Memory system 20 includes any suitable type, number, and configuration of volatile or non-volatile storage devices configured to store instructions and data. The storage devices of memory system 20 represent computer readable storage media that store computer-executable instructions including process 12, OS 14, and resource management layer 18. The instructions are executable by a computer system to perform the functions and methods of process 12, OS 14, and resource management layer 18 described herein. Examples of storage devices in memory system 20 include hard disk drives, random access memory (RAM), read only memory (ROM), flash memory drives and cards, and magnetic and optical disks.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specifies a policy for scheduler 22.

Scheduler 22 interacts with OS 14 and resource management layer 18 to negotiate processing and other resources of the computer system in a manner that is transparent to process 12. OS 14 allocates memory 20 to scheduler 22 in response to requests from virtual processors 32. Resource management layer 18 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

Prior to executing tasks, scheduler 22 obtains execution contexts 34 and 38 from runtime environment 10 or operating system 14. Available virtual processors 32 locate and execute execution contexts 34 and 38 to begin executing tasks. The set of execution contexts in scheduler 22 includes a set of execution contexts 34(1)-34(N) with respective, associated tasks 36(1)-36(N) that are being executed by respective virtual processors 32(1)-32(N), a set of zero or more runnable execution contexts 38, and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion or a blocking point (e.g. waiting for a message or a stolen child task to complete) on virtual processors 32 before picking up new tasks. An execution context 34 executing on a virtual processor 32 may also unblock other execution contexts 40 by generating data, a message, or an event that will be used by another execution context 40.

Figure 5:
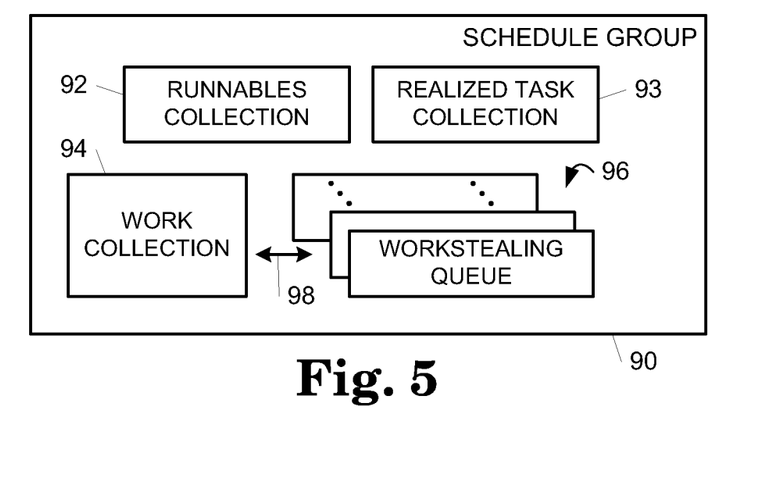
FIG. 5 is a block diagram illustrating an embodiment of a schedule group for use in a scheduler.

Each task in scheduler 22 may be realized (e.g., realized tasks 36 and 39), which indicates that an execution context 34 or 38 has been or will be attached to the task and the task is ready to execute. Realized tasks typically include light weight tasks and agents and may be associated with an execution context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 5 described below.

Upon completion, blocking, or other interruption (e.g., explicit yielding or forced preemption) of a task 36 associated with an execution context 34 running on a virtual processor 32, the virtual processor 32 becomes available to execute another realized task 39 or unrealized task 42. Scheduler 22 searches for a runnable execution context 38, a realized task 39, or an unrealized task 42 to attach to the available virtual processor 32 for execution in any suitable way. For example, scheduler 22 may first search for a runnable execution context 38 to execute before searching for a realized task 39 or an unrealized task 42 to execute. Scheduler 22 continues attaching execution contexts 38 to available virtual processors 32 for execution until all execution contexts 38 of scheduler 22 have been executed. In other embodiments, runnable execution contexts 38 and realized tasks 39 may be merged into single concept from the perspective of schedulers 22.

Scheduler 22 includes one or more memory allocators (not shown) that cause memory to be allocated for internal data structures of scheduler 22 (not shown) and tasks 36 of execution contexts 34 executing on virtual processors 34. The memory allocators request and receive access to pages of memory from OS 14 and allocate objects or other suitable portions of memory from the pages to tasks 36 executing on virtual processors 32. OS 14 may provide pages in predefined sizes of memory such as page sizes of 4 kilobytes (KB) to 64 KB to the memory allocators.

The memory allocated to tasks 36 may include thread or context local storage (TLS or CLS) (not shown). With thread and context local storage, the allocated memory corresponds to an execution context 34 that is currently being executed by a virtual processor 32. This memory is saved along with the program state and machine state information of an execution context 34 when the execution context 34 blocks or is otherwise interrupted so that the memory can be restored when the corresponding thread or context resumes. The thread or context local storage may be moved to a new virtual processor 32 along with the execution context 34 when the execution context 34 is picked up by the new virtual processor 32 for execution. As a result, thread and context local storage is only available to tasks 36 that are executed on an execution context 34 that corresponds to the thread or context local storage. Thread and context local storage does not persist across execution contexts, and the contents of thread and context local storage are not maintained across execution contexts.

The memory allocated to tasks 36 also includes virtual processor local storages 44. Virtual processor local storages 44 are allocated in response to one or more requests from one or more tasks 36. Each virtual processor local storage 44 corresponds to a different virtual processor 32. Each virtual processor local storage 44 persists across all execution contexts 34 that execute on a corresponding virtual processor 32. Accordingly, the contents of virtual processor local storages 44 are maintained when execution contexts 34 complete, block, or are otherwise interrupted on virtual processors 32. Such contents are not saved with the program state and machine state information of an execution context 34 when the execution context 34 blocks or is otherwise interrupted.

Subsequent execution contexts 34 executed by available virtual processors 32 may access, modify, and/or overwrite the data in corresponding virtual processor local storages 44. Because each virtual processor 32 may execute only one execution context 34 at any given time, the execution context 34 executing on a given virtual processor 32 may access the virtual processor local storage 44 corresponding to the virtual processor 32 without synchronization. As a result, each virtual processor 32 allows different tasks 36 that execute on different execution contexts 34 to access the same data in the virtual processor local storage 44 corresponding to the virtual processor 32 at different times without synchronization (i.e., without using locks or other synchronization techniques on the data). In addition, an element of data inserted into a virtual processor local storage 44 by a given execution context 34 may have no correlation to an element of data later retrieved by the same execution context 34. For example, a first execution context executing on a given virtual processor 32 stores the value 5 in virtual processor local storage 44 of the virtual processor 32 and subsequently blocks. A second execution context is then scheduled on the virtual processor 32 and overwrites the value 5 in virtual processor local storage 44 of the virtual processor 32 with the value 99. If the first execution context is subsequently unblocked and rescheduled on the virtual processor 32, then the first execution context will read the value in virtual processor local storage 44 as 99—not the value of 5 that the first execution context stored.

An execution context 34 on one virtual processor 32 may also access the virtual processor local storage 44 of another virtual processor 32. In one embodiment, such an execution context 34 employs locks or other synchronization techniques when accessing the virtual processor local storage 44 of another virtual processor 32 to prevent conflicting accesses of the virtual processor local storage 44. Such an embodiment is described in additional detail below with reference to FIG. 4A. In other embodiments, the virtual processor local storage 44 may be structured to inherently prevent conflicting accesses to allow access by an execution context 34 of another virtual processor 32 without synchronization. Such an embodiment is described in additional detail below with reference to FIG. 4B.

Figure 2:
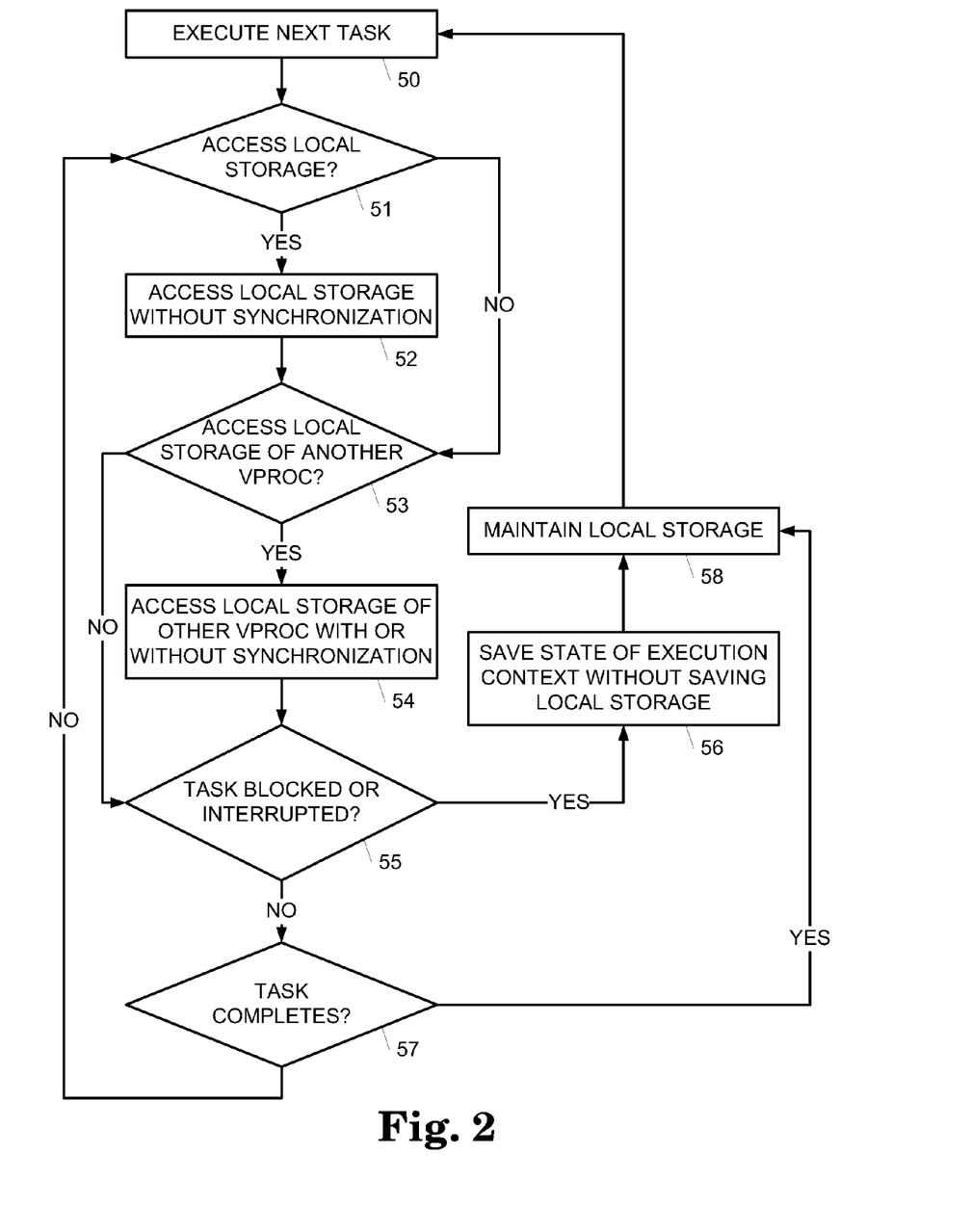
FIG. 2 is a flow chart illustrating an embodiment of a method for accessing local storage of a processing resource.

Virtual processor local storage 44 may be allocated for each virtual processor 32 in process 12. FIG. 2 is a flow chart illustrating an embodiment of a method for accessing virtual processor local storage 44 of a virtual processor 32. The method of FIG. 2 may be performed by each virtual processor 32 in scheduler 22 where corresponding virtual processor local storage 44 is or will be allocated according to one embodiment.

In FIG. 2, a virtual processor 32 executes a next task 36 in an execution context 34 as indicated in a block 50. If the task 36 accesses local storage 44 of the virtual processor 32 executing the task 36 as indicated in a block 51, then the execution context 34 executing on the virtual processor 32 accesses the corresponding local storage 44 without synchronization as indicated in a block 52. The virtual processor 32 may allocate the corresponding local storage 44, if not present, in response to the task 36 requesting and/or accessing the corresponding local storage 44.

If the task 36 accesses local storage 44 of another virtual processor 32 as indicated in a block 53, then the execution context 34 executing on the virtual processor 32 accesses the local storage 44 of the other virtual processor 32 with or without synchronization, as appropriate, as indicated in a block 54. An embodiment of local storage 44 that involves synchronization when accessed by a non-corresponding virtual processor 32 is described with reference to FIG. 4A below, and an embodiment of local storage 44 that does not involve synchronization when accessed by a non-corresponding virtual processor 32 is described with reference to FIG. 4B below.

Task 36 repeats the functions of blocks 51 through 54 until task 36 blocks, is interrupted, or completes. When task 36 becomes blocked or interrupted as indicated in a block 55, the virtual processor 32 saves the state of the task 36 and execution context 34 without saving the contents of the corresponding local storage 44 as indicated in a block 56. To do so, virtual processor 32 stores the state of the task 36 and execution context 34 in memory 20 to allow the state to be retrieved from memory 20 when the task 36 and execution context 34 resume. When task 36 becomes blocked or interrupted or completes as indicated in a block 57, the virtual processor 32 maintains the corresponding local storage as indicated in a block 58. As described above, the corresponding local storage 44 persists across tasks 36 and execution contexts 34 such that subsequent tasks 36 and execution contexts 34 may access, modify, and/or overwrite data stored in the local storage 44 by previous tasks 36 and execution contexts 34.

Subsequent to a task 36 blocking, being interrupted, or completing, the virtual processor 32 accesses a next task 36 for execution. If the previous task 36 blocked or was otherwise interrupted, then the virtual processor 32 executes the next task 36 on a next execution context 34. If the previous task 36 completed, then the virtual processor 32 may execute the next task 36 as a continuation on the same execution context 34 or may execute the next task 36 on a next execution context 34.

Because virtual processor local storages 44 allow data to be segmented, stored, and accessed without synchronization, virtual processor local storages 44 may be used to implement lock-free techniques such as a generalized reduction where a set of values is combined through an associative operator. Virtual processor local storages 44 may be thought of as highly efficient storage for accumulators of data. For example, a set of data S may include elements X(1) through X(n) where n>=2 as shown in Equation I.

$$S=\{X(1), \ldots, X(n)\} \qquad \text{Equation I}$$

The set of data S may be operated on by an operator op as shown in Equation II.

$$\{x,y\} \rightarrow x \text{ op } y \qquad \text{Equation II}$$

With the set of data S and the operator op, a reduction may be determined using Equation III.

$$S \rightarrow X(1) \text{ op } X(2) \text{ op } X(3) \text{ op } \ldots \text{ op } X(n) \qquad \text{Equation III}$$

For example, the set of data S may be a set of integer numbers and the operator op may be integerpoint addition. As another example, the set of data S may be a set of n×n matrices and the operator op may be matrix multiplication. Other examples may use floating point math even though strictly speaking floating point math is not associative. But this limitation may be obviated through viewing floating point numbers as equivalence classes modulo a relative epsilon error (viz. e~f iff abs(e−f)<epsilon*max{abs(e), abs(f)}).

When computing the reduction in parallel in scheduler 22, the set of data S may be partitioned and every virtual processor 32 may be given a subset of S on which to apply the operator op. The accumulator for the operator op is kept in virtual processor local storage 44 on each virtual processor 32 and when all virtual processors 32 have finished their work, the accumulators stored locally in virtual processor local storages 44 are combined to achieve the result of the reduction. Some synchronization may be performed in the final combine step in accessing the virtual processor local storages 44. No synchronization is performed, however, when storing or reading from a given virtual processor local storage 44 where the access is made from the corresponding virtual processor 32.

Figure 3A:
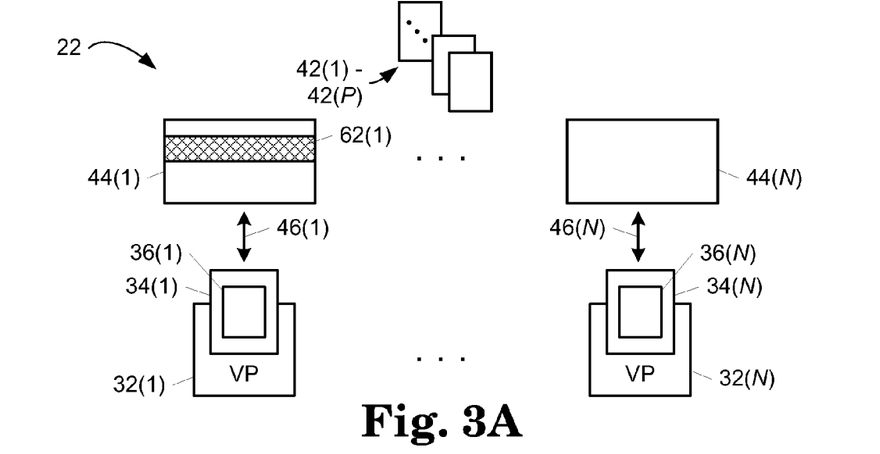
FIGS. 3A-3C are block diagrams illustrating embodiments of the use of local storage in implementing a generalized reduction.
Figure 3B:
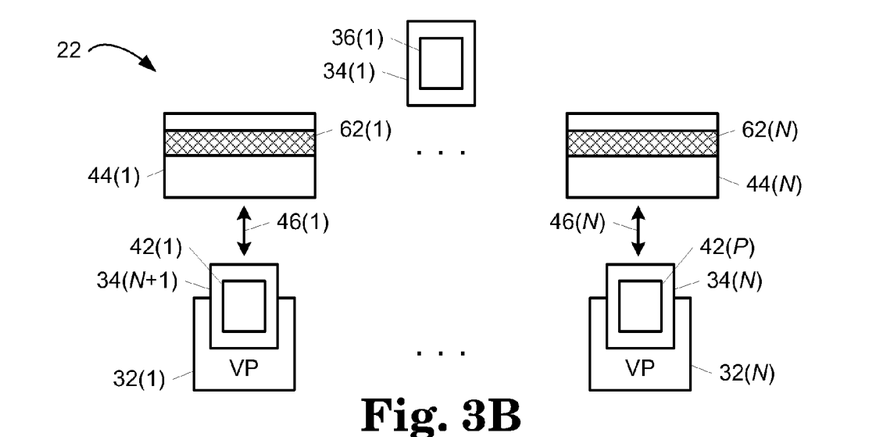
Figure 3C:
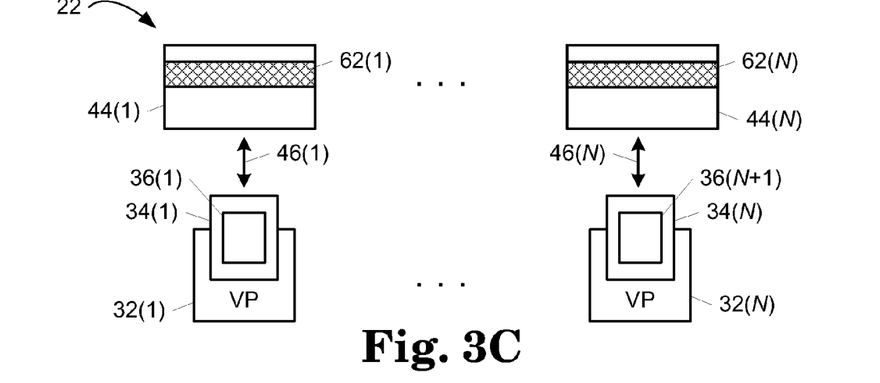

FIGS. 3A-3C are block diagrams illustrating embodiments of the use of virtual processor local storage 44 in implementing a generalized reduction in scheduler 22. As shown in FIG. 3A, virtual processors 32(1)-32(N) may be initially executing respective execution contexts 34(1)-34(N) with respective tasks 36(1)-36(N). Task 36(1) begins a generalized reduction operation by allocating a slot 62(1) in virtual processor local storage 44(1) for the reduction and generating a set of tasks 42(1)-42(P) to be executed where P is greater than or equal to one. Task 36(1) provides each task 42(1)-42(P) with a subset of data of the reduction to apply the operator. Task 36(1) may compute a part of the reduction by applying an operator to a subset of the data of the reduction and storing the result in slot 62(1).

At some point, task 36(1) may block (e.g., subsequent to computing a part of the reduction and while waiting for the remaining tasks 42(1)-42(P) to be executed) as shown in FIG. 3B. When task 36(1) blocks, virtual processor 32(1) saves the state of execution context 34(1) and task 36(1) and maintains the data in slot 62(1). Virtual processor 32(1) may then execute a new execution context 34(N+1) which may execute task 42(1). Task 42(1) computes its part of the reduction by applying the operator to any data stored in slot 62(1) and its subset of the data and storing the intermediate result in slot 62(1).

Other virtual processors 32 also execute the remaining tasks 42(2)-42(P). For example, virtual processor 32(N) executes task 42(P) as a continuation on execution context 34(N) subsequent to task 36(N) completing as shown in FIG. 3B. Task 42(P) causes slot 62(N) to be allocated in virtual processor local storage 44(N), if not already allocated, and computes its part of the reduction by applying the operator to any data stored in slot 62(N) and its subset of the data and storing the intermediate result in slot 62(N). Other virtual processors 32 may execute any number (including zero) of the tasks 42(2)-42(P−1) and allocate corresponding slots 62 for storing intermediate results.

Subsequent to all tasks 42(1)-42(P) being executed, task 36(1) becomes unblocked and resumes execution on an available virtual processor 32. In the example of FIG. 3C, virtual processor 32(1) resumes task 36(1) and execution context 34(1) to complete the reduction. To do so, task 36(1) accesses all data in slots 62(1)-62(N), possibly with synchronization for slots 62(2)-62(N), and applies the operator to the data from slots 62(1)-62(N) to generate the final result of the reduction. Task 36(1) stores the final value in slot 62(1) or another suitable location.

The remaining virtual processors 32 continue execution of tasks 36 as described above with reference to FIG. 1. For example, virtual processor 32(N) executes task 36(N+1) as a continuation on execution context 34(N) subsequent to task 42(P) completing as shown in FIG. 3C.

Virtual processor local storages 44 provide two aspects of usage. First, virtual processor local storages 44 provide an accumulator/combinable aspect which forms an unstructured reduction implementation. In this aspect, elements of data inserted into virtual processor local storages 44 are not retrieved but instead accumulate to a value that is later retrieved across all virtual processor local storages 44. Second, virtual processor local storages 44 provide a reuse pooling/reusable aspect. In this aspect, elements of data inserted into virtual processor local storages 44 are interchangeable so that when an element is retrieved by a virtual processor 32, it is immaterial which element it is.

Figure 4A:
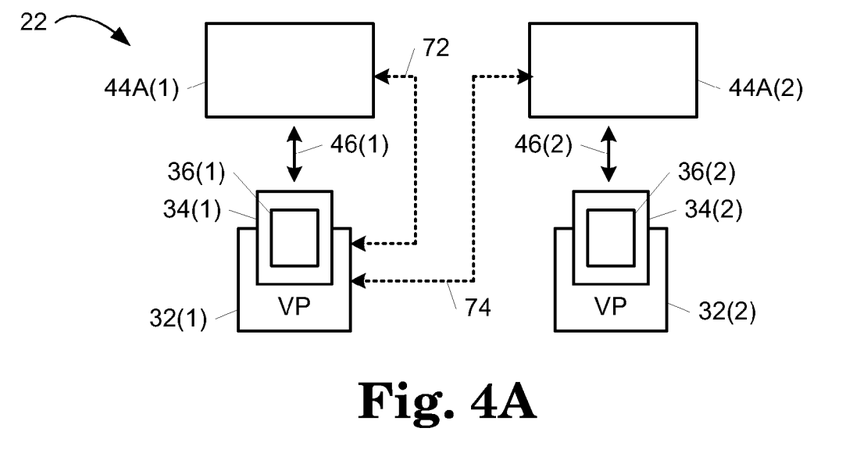
FIGS. 4A-4B are block diagrams illustrating embodiments of local storages.

FIG. 4A is a block diagram illustrating an embodiment 44A of virtual processor local storages 44. In the embodiment of FIG. 4A, virtual processor local storages 44A are unstructured portions of memory that may be accessed without synchronization by a corresponding virtual processor 32 but are accessed with synchronization by a non-corresponding virtual processor 32. For example, virtual processor 32(1) accesses corresponding virtual processor local storages 44A(1) without synchronization as indicated by an arrow 72 but uses a lock or other suitable synchronization technique to access non-corresponding virtual processor local storages 44A(2) as indicated by an arrow 74. The synchronization ensures that the access to non-corresponding virtual processor local storages 44A(2) does not conflict with an access by virtual processor 32(2) or another virtual processor 32 (not shown).

Figure 4B:
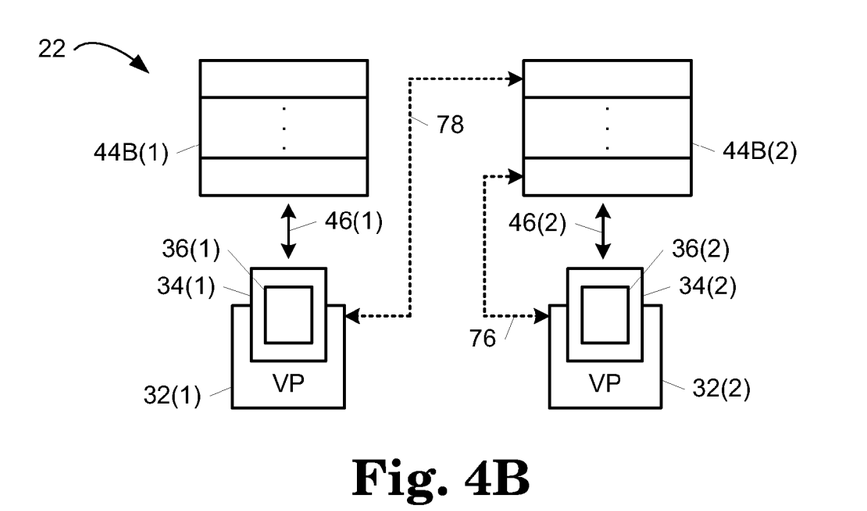

FIG. 4B is a block diagram illustrating an embodiment 44B of virtual processor local storages 44. In the embodiment of FIG. 4B, virtual processor local storages 44B are structured as workstealing deques that may be accessed without synchronization by both a corresponding virtual processor 32 and non-corresponding virtual processors 32. Each virtual processor local storage 44B is structured to allow a corresponding virtual processor 32 to add or remove data from one end and all other virtual processors (i.e., the non-corresponding virtual processors 32) to add or remove data from the other end, possibly simultaneously with accesses by the corresponding virtual processor 32. Because the structure of virtual processor local storages 44B, all access may be performed without synchronization. For example, virtual processor 32(2) accesses corresponding virtual processor local storages 44B(2) without synchronization as indicated by an arrow 76 and, possibly simultaneously, virtual processor 32(1) accesses non-corresponding virtual processor local storages 44B(2) without synchronization as indicated by an arrow 78.

To implement virtual processor local storages 44B, a workstealing deque may be allocated on each virtual processor 32 and an array may be formed of all of the workstealing deques. The array may be used to form self-load-balancing workqueues for scheduler 22.

In the above embodiments, scheduler 22 may operate as a cooperative scheduler where process 12 and other processes are associated with virtual processors 32 in a controlled way. In other embodiments, scheduler 22 may operate as another type of scheduler such as a preemptive scheduler.

Although one instance of scheduler 22 was shown in the embodiment of FIG. 1, other embodiments may include other instances of scheduler 22 where each instance includes virtual processor local storage 44 for each virtual processor 32.

In one embodiment, process 12 (shown in FIG. 1) organizes tasks into one or more schedule groups 90 (shown in FIG. 5) and presents schedule groups 90 to scheduler 22 as shown in FIG. 5. In other embodiments, process 12 organizes tasks into collections for each virtual processor 32 of scheduler 22 in other suitable ways.

FIG. 5 is a block diagram illustrating an embodiment of a schedule group 90 for use in a scheduler 22. Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 39 (e.g., unstarted agents) that may or may not have associated execution contexts 38. Scheduler 22 adds a realized task to realized task collection 93 when a new, unstarted task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42 with no assigned execution context 34 or 38.

Using the embodiment of FIG. 5, scheduler 22 may first search for unblocked execution contexts 38 in the runnables collection 92 of each schedule group 90 in scheduler 22. Scheduler 22 may then search for realized tasks in the realized task collection 93 of all schedule groups 90 before searching for unrealized tasks in the workstealing queues 96 of the schedule groups 90.

In one embodiment, a virtual processor 32 that becomes available may attempt to locate a runnable execution context 38 in the runnables collection 92 or a realized task 40 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 40 in the realized task collection 93 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 in a round-robin or other suitable order.

In other embodiments, schedule groups 90 contain other suitable numbers, types, and/or configurations of task collections.

Figure 6:
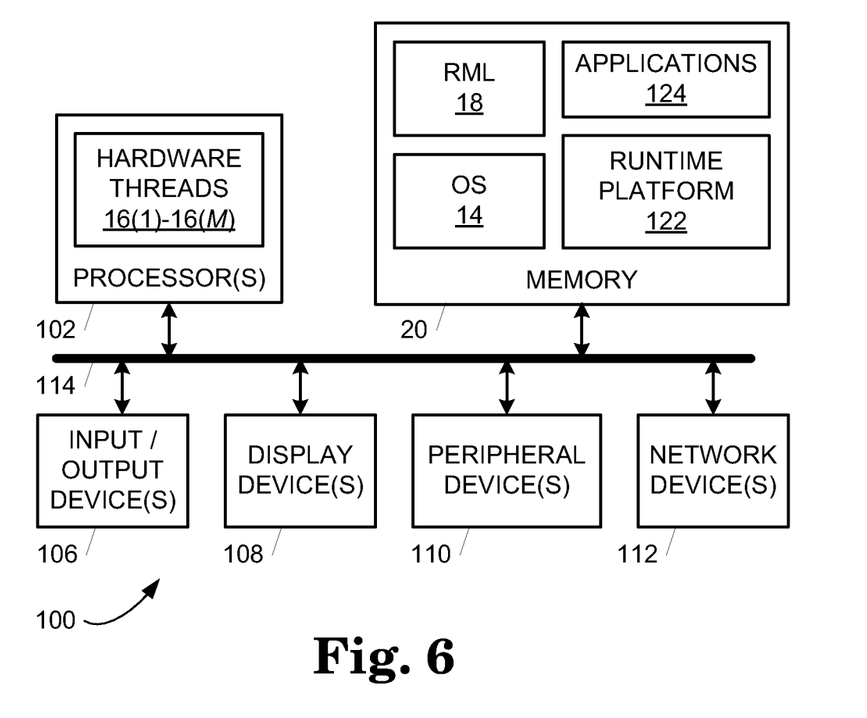
FIG. 6 is a block diagram illustrating an embodiment of a computer system configured to implement a runtime environment that includes a scheduler in a process.

FIG. 6 is a block diagram illustrating an embodiment of computer system 100 which is configured to implement runtime environment 10 including scheduler 22 in process 12 where scheduler 22 is configured to schedule execution contexts for execution by processing resources as described above.

Computer system 100 includes one or more processor packages 102, memory system 20 (also shown in FIG. 1), zero or more input/output devices 106, zero or more display devices 108, zero or more peripheral devices 110, and zero or more network devices 112. Processor packages 102, memory system 20, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 20, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 20. The instructions may include a basic input output system (BIOS) or firmware (not shown), OS 14 (also shown in FIG. 1), a runtime platform 122, applications 124, and resource management layer 18 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 14. OS 14 includes instructions executable by hardware threads 16 to manage the components of computer system 100 and provide a set of functions that allow applications 124 to access and use the components. In one embodiment, OS 14 is the Windows operating system. In other embodiments, OS 14 is another operating system suitable for use with computer system 100.

Resource management layer 18 includes instructions that are executable in conjunction with OS 14 to allocate resources of computer system 100 including hardware threads 16 as described above with reference to FIG. 1. Resource management layer 18 may be included in computer system 100 as a library of functions available to one or more applications 124 or as an integrated part of OS 14.

Runtime platform 122 includes instructions that are executable in conjunction with OS 14 and resource management layer 18 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 14 and/or resource management layer 18.

Each application 124 includes instructions that are executable in conjunction with OS 14, resource management layer 18, and/or runtime platform 122 to cause desired operations to be performed by computer system 100. Each application 124 represents one or more processes, such as process 12 as described above, that may execute with one or more schedulers 22 as provided by runtime platform 122.

As noted above, memory system 20 includes any suitable type, number, and configuration of volatile or non-volatile storage devices configured to store instructions and data. The storage devices of memory system 20 represent computer readable storage media that store computer-executable instructions including OS 14, resource management layer 18, runtime platform 122, and applications 124.

Memory system 20 stores instructions and data received from processor packages 102, input/output devices 106, display devices 108, peripheral devices 110, and network devices 112. Memory system 20 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a scheduler in a process executing on a computer system, the method comprising:
 allocating first local storage corresponding to a first processing resource of the scheduler;
 allowing first and second execution contexts that execute on the first processing resource at different times to access the first local storage without synchronization;
 accessing the first local storage with the first execution context on the first processing resource;
 subsequent to accessing the first local storage with the first execution context, blocking the first execution context on the first processing resource to allow a third execution context on a second processing resource to access the first local storage, the third execution context accessing the first local storage while executing on the second processing resource; and
 in response to said blocking:
  maintaining data in the first local storage; and
  saving state information of the first execution context to a memory external to the first processing resource without saving the data from the first local storage to the memory external to the first processing resource.

2. The method of claim 1 further comprising:
 subsequent to blocking the first execution context on the first processing resource, accessing the first local storage with the third execution context executing on the second processing resource.

3. The method of claim 1 further comprising:
 allocating second local storage corresponding to the second processing resource of the scheduler; and
 allowing the third execution context and a fourth execution context that execute on the second processing resource at different times to access the second local storage without synchronization.

4. The method of claim 1 further comprising:
executing the first execution context on the first processing resource to apply an operator to data stored in the first local storage; and
executing the second execution context on the first processing resource to apply the operator to the data stored in the first local storage.

5. The method of claim 1 further comprising:
allowing a fourth execution context executing on the second processing resource to access the first local storage with synchronization.

6. The method of claim 1 further comprising:
structuring a second local storage corresponding to a third processing resource of the scheduler as a workstealing deque; and
allowing a fourth execution context executing on the second processing resource to access the second local storage without synchronization.

7. The method of claim 1 wherein the first processing resource includes a virtual processor that maps to a hardware thread.

8. A method performed by scheduler in a process executing on a computer system, the method comprising:
accessing first local storage corresponding to a first virtual processor by a first plurality of execution contexts that execute on the first virtual processor at different times without synchronization;
accessing second local storage corresponding to a second virtual processor by a second plurality of execution contexts that execute on the second virtual processor at different times without synchronization;
subsequent to accessing the first local storage by at least one of the first plurality of execution contexts, blocking the at least one of the first plurality of execution contexts on the first virtual processor to allow at least one of the second plurality of execution contexts on the second virtual processor to access the first local storage corresponding to the first virtual processor, the at least one of the second plurality of execution contexts accessing the first local storage while executing on the second virtual processor; and
in response to said blocking:
maintaining data in the first local storage corresponding to the first virtual processor; and
saving state information of the at least one of the first plurality of execution contexts to a memory external to the first virtual processor without saving the data from the first local storage to the memory external to the first virtual processor.

9. The method of claim 8 wherein accessing the first local storage includes:
applying an operator to first data from the first local storage with a first one of the first plurality of execution contexts to generate a first result; and
storing the first result in the first local storage.

10. The method of claim 9 wherein accessing the first local storage includes:
applying the operator to the first result from the first local storage with a second one of the first plurality of execution contexts to generate a second result.

11. The method of claim 10 wherein accessing the second local storage includes:
applying the operator to second data from the second local storage with a first one of the second plurality of execution contexts to generate a third result; and
storing the third result in the second local storage.

12. The method of claim 11 wherein accessing the second local storage includes:
applying the operator to the third result from the second local storage with a second one of the second plurality of execution contexts to generate a fourth result.

13. The method of claim 12 further comprising:
generating a fifth result from the second result and the fourth result.

14. The method of claim 8 further comprising:
subsequent to blocking the at least one of the first plurality of execution contexts on the first virtual processor, accessing the first local storage with the at least one of the second plurality of execution contexts executing on the second virtual processor.

15. The method of claim 8 further comprising:
allowing at least two of the second plurality of execution contexts executing on the second virtual processor at different times to access the second local storage without synchronization.

16. A computer readable storage medium, which is not a signal, storing computer-executable instructions that, when executed in a scheduler of a process of a computer system, perform a method comprising:
applying an operator on first and second subsets of data with first and second execution contexts, respectively, executing on first and second processing resources, respectively, to generate first and second results, respectively;
storing the first and the second results in first and second local storages, respectively, corresponding to the first and the second processing resources, respectively, without synchronization;
blocking the first execution context prior to executing a third execution context on a third processing resource to allow the third execution context to access the first local storage while executing on the third processing resource; and
in response to said blocking:
maintaining data in the first local storage; and
saving state information of the first execution context to a memory external to the first processing resource without saving the data from the first local storage to the memory external to the first processing resource.

17. The computer readable storage medium of claim 16, the method further comprising:
combining the first and the second results from the first and the second local storages.

18. The computer readable storage medium of claim 17, the method further comprising:
applying the operator on a third subset of data and the first result with a fourth execution context executing on the first processing resource to generate a third result; and
storing the third result in the first local storage without synchronization.

19. The computer readable storage medium of claim 16, the method further comprising:
resuming the first execution context on the second processing resource; and
applying the operator on a fourth subset of data and the second result with the first execution context executing on the second processing resource to generate a fourth result.

20. The computer readable storage medium of claim 16, the method further comprising:

blocking the second execution context prior to executing the first execution context on the second processing resource.

\* \* \* \* \*